United States Patent [19]

Kostelnik

[11] Patent Number: 4,647,633

[45] Date of Patent: Mar. 3, 1987

[54] POLYMERIZATION PROCESS

[75] Inventor: Robert J. Kostelnik, West Chester, Pa.

[73] Assignee: Atlantic Richfield Company, Los Angeles, Calif.

[21] Appl. No.: 796,357

[22] Filed: Nov. 7, 1985

Related U.S. Application Data

[63] Continuation of Ser. No. 489,658, Apr. 28, 1985, abandoned.

[51] Int. Cl.$^4$ .............................. C08F 4/64; C08F 4/44
[52] U.S. Cl. ................................. 526/153; 252/8.551; 502/110
[58] Field of Search ........ 252/8.55 R, 8.510; 526/153; 502/110

[56] References Cited

U.S. PATENT DOCUMENTS

| | | | |
|---|---|---|---|
| 2,943,063 | 6/1960 | Eby et al. | 502/110 |
| 3,257,368 | 6/1966 | Winkler | 526/153 |
| 3,445,443 | 5/1969 | Sasaki et al. | 526/153 |
| 3,692,676 | 9/1972 | Culter et al. | 252/855 R |
| 3,723,350 | 3/1973 | Schmitt et al. | 502/110 |
| 4,093,789 | 6/1978 | Kuroda et al. | 526/153 |
| 4,415,714 | 11/1983 | Mack | 252/8.55 |

*Primary Examiner*—Theodore Morris
*Attorney, Agent, or Firm*—Coleman R. Reap

[57] ABSTRACT

The hydrocarbon fluid friction reducing properties of copolymers of two or more alpha-monoolefins having 2 to about 30 carbon atoms is improved by copolymerizing the monomers in the liquid state by means of a Ziegler catalyst and a two-component activator system comprised of a trialkylaluminum compound and a dialkylaluminum halide compound.

7 Claims, No Drawings

POLYMERIZATION PROCESS

This ia a continuation of application Ser. No. 489,658, filed 4/28/85 now abandoned.

BACKGROUND OF THE INVENTION

1. Field of the Invention

This invention relates to the preparation of alpha-olefin copolymers and more particularly to the preparation of alpha-olefin copolymers having improved hydrocarbon oil pipeline friction-reducing properties.

2. Prior Art

When fluids are pumped through a conduit, such as a pipeline, friction resulting from the movement of the fluid over the inside surface of the conduit causes a pressure drop in the fluid which increases as the downstream distance from the pump increases. The pressure drop results in reduced flow rates. It is known that the flow rate of the fluid through the conduit can be increased by reducing the friction of the fluid in the conduit.

Hydrocarbon fluid frictional loss in conduits can be reduced by injecting into the fluid polymeric substances which are capable of reducing the friction loss of the fluid moving through the conduit. It has been reported that alpha-monoolefin polymers are particularly useful for reducing friction loss in hydrocarbons such as crude oil flowing through pipelines. U.S. Pat. No. 3,692,676 discloses the reduction of friction loss in hydrocarbon liquids flowing through pipelines by adding to such liquids small amounts of homopolymers or copolymers of alpha-olefins having from 6 to 20 carbon atoms. U.S. Pat. Nos. 3,351,079; 3,493,000; 3,559,664 and 3,682,187, disclose the addition of polyethylene or copolymers of ethylene and propylene or other low molecular weight alpha-monoolefins to hydrocarbon fluids to reduce fluid friction loss. U.S. patent application Ser. No. 230,775 filed Feb. 2, 1981 now abandoned discloses the addition of copolymers of butene-1 and at least one other alpha-monoolefin to a hydrocarbon fluid flowing in a pipeline to reduce frictional loss. The specifications of the above patents and patent application are incorporated herein by reference.

Even though such additives may effect drag reduction in hydrocarbon liquids flowing through conduits their use is expensive because of their high costs and the large quantities of them required in continuous use applications. Accordingly, improvements which lower the cost of use of these drag reducing agents, such as increasing their efficiency, are continuously sought.

U.S. Pat. Nos. 2,976,271 and 2,983,720 disclose the polymerization of propylene and butene-1, respectively, by means of a three component catalyst comprised of aluminumtrialkyl, aluminumdialkyl monohalide and a reducible compound of titanium, such as titanium tetrachloride. U.S. Pat. No. 2,971,925 discloses the preparation of polymers of monoolefins having a high degree of linearity by polymerizing monoolefins in the presence of catalyst prepared by reacting aluminumtriethyl and titanium tetrachloride and reacting the resulting product with a hydrocarbon solution of aluminumdiethyl chloride. U.S. Pat. No. 2,943,063 discloses the polymerization of olefins in the presence of a catalyst comprised of combinations of titanium tetrahalide with trialkylaluminum or dialkylaluminum halide. U.S. Pat. No. 3,222,295 discloses the preparation of monoolefin polymerization catalysts by reacting a titanium tetrahalide with a dialkylaluminum halide and reacting the resulting complex with an aluminumtrialkyl compound. U.S. Pat. Nos. 3,257,368, 3,261,821 and 3,281,375 teach the preparation of alpha-monoolefin polymers by a catalyst prepared by reacting a solution of aluminumtriethyl and titanium tetrachloride with aluminumdialkyl halides. U.S. Pat. No. 3,723,350 discloses olefin polymerization catalysts made by reducing a mixture of metallic halides, including a titanium tetrachloride with a dialkylaluminum halide and reacting the reduction product with an aluminumtrialkyl, an alkylaluminum halide and/or a dialkylaluminum halide.

The above references show the use of trialkylaluminum compounds and dialkylaluminum halides alone or in combination as activators for alpha-monoolefin catalyst polymerizations. It has been observed that trialkylaluminum activators used alone increase the rate of Ziegler catalyzed polymerization of alpha-monoolefins, but the drag reducing effectiveness of the resulting polymers is relatively low. On the other hand the drag reducing effectiveness of alphamonoolefin copolymers prepared with a Ziegler catalyst activated solely by a dialkylaluminum halide is better than those obtained using trialkylaluminum as the sole activator but the rate of polymerization of the former products is relatively low.

SUMMARY OF THE INVENTION

A method of improving the efficiency of alphamonoolefin copolymer based hydrocarbon oil pipeline friction reducing agents has now been discovered. Accordingly, it is an object of the invention to present an improved method of producing alpha-monoolefin copolymer hydrocarbon conduit friction reducing agents. It is another object of the invention to present a method of producing alpha-monoolefin copolymers having improved hydrocarbon conduit friction reducing properties. It is another object of the invention to present alpha-monoolefin copolymers having improved hydrocarbon conduit friction reducing properties. These and other objects of the invention are supported in the following description and examples.

In accordance with the teachings of the invention the friction reducing properties of alpha-monoolefin copolymers prepared in an inert solvent by the Ziegler polymerization process is improved significantly by conducting the polymerization in the presence of a mixture of at least one dialkylaluminum halide and at least one trialkylaluminum compound. In fact, the drag-reducing effectiveness of alpha-monoolefin copolymers prepared in accordance with the invention is better than the effectiveness of alpha-monoolefin copolymers prepared using either a trialkylaluminum compound or a dialkylaluminum halide compound as the sole activator. Furthermore, the rate of polymerization of the alpha-monoolefin monomers is higher than when dialkylaluminum halide catalysts are used alone.

The copolymers of the invention are prepared from two or more alpha-monoolefins having 2 to 30 or more carbon atoms. In preferred embodiments of the invention the dialkylaluminum halide is diethylaluminum chloride, the trialkylaluminum compound is triethylaluminum and the preferred alpha-monoolefin monomer reactants are those having 4 to 16 carbon atoms.

DETAILED DESCRIPTION OF THE INVENTION

The improved copolymers of the invention are prepared from alpha-monoolefins having 2 to about 30 or more carbon atoms. Alpha-monoolefins having more than about 30 carbon atoms can be used in the preparation of hydrocarbon pipeline friction-reducing agents but they are not usually employed due to their lower reactivities. Generally, highly favorable results have been observed when the friction reducing polymers are propared from alpha-monoolefins having 4 to about 20 carbon atoms. These monomers are preferred for use in the process of the invention since they are most easily polymerized to high molecular weight polymers under liquid state polymerization conditions. The most preferred monomers are those prepared from butene-1 and at least one other alpha-monoolefin having 5 to 16 carbon atoms. The polymeric compositions of the invention may be prepared from two or from more than two alpha-monoolefins. When two alpha-monoolefin components are employed each alpha-monoolefin component is usually present in the reaction mixture in an amount sufficient to produce a copolymer containing at least 10 mole percent of each component. In a preferred embodiment of the two alpha-monoolefin component system each component is present in an amount sufficient to produce copolymers containing 25 or more mole percent of each component. In three or more alpha-monoolefin component systems it is preferred that the maximum content of any one monomer is 90 mole percent and most preferably 75 mole percent, based on the total number of moles of alpha-monoolefin monomer present in the reaction mixture.

Examples of two component polymer systems are propene-dodecene-1 copolymer, butene-1-dodecene-1 copolymer, butene-1-decene-1 copolymer, hexene-1-dodecene-1 copolymer, and octene-1-tetradecene-1 copolymer, etc. Examples of three component systems include butene-1-decene-1-dodecene-1 terpolymer, propene-hexene-1-dodecene-1 terpolymer, etc. Preferred specific copolymeric systems are propene-dodecene-1 copolymer, butene-1-decene-1 copolymer, butene-1-dodecene-1 copolymer, and hexene-1-dodecene-1 copolymer.

The process of the invention can be practiced employing batch or continous techniques using suitably equipped reaction vessels for the polymerization. Stainless steel and glass-lined reactors are preferred to ordinary steel vessels, since they permit easier control of product quality. Suitable reaction vessels are those equipped with agitator or other mixing means capable of maintaining the reaction mixture uniformly distributed, and cooling means sufficient to maintain the reacting polymerization mixture at the desired temperature in the reaction zone.

The polymerization reaction desirably at least partially carried out in the presence of an inert solvent or diluent for the polymeric product. The early stage of the polymerization may be carried out by mass polymerization, i.e. the monomer charge can serve as the polymerization medium. However, as the polymerization proceeds the viscosity of the reaction mixture increases because of the formation of polymer and it often becomes increasingly more difficult to provide adequate mixing to dissipate the heat built up during the reaction, which is exothermic. It may then become necessary to form a solution or slurry of the reaction mixture by adding an inert solvent or diluent to the reaction mixture to facilitate temperature and product uniformity control. Suitable solvents and diluents include kerosene, naphtha, petroleum distillate, and alkanes having 6 to 10 carbon atoms, such as heptane, octane, etc.

The polymerization is carried out by the Ziegler process using a catalyst comprising one or more reducible or reduced heavy metal compounds and a catalyst activator comprised of at least one trialkylaluminum compound and at least one dialkylaluminum halide compound. Reducible heavy metal compounds suitable for use in the invention include the halides, oxyhalides, acetyl acetonates, etc. of the metals of Groups IV-B, V-B, or VIII of the Periodic Chart of the Elements found on pages 392–393 of the Handbook of Chemistry and Physics, 37th Edition. Suitable reducible compounds for use as the catalyst include the tetravalent compounds of titanium and zirconium, and the compounds of vanadium, niobium, cobalt, nickel, etc. Preferred catalysts are the reducible or reduced compounds of titanium, zirconium, vanadium and niobium. Examples of typical reducible catalysts include the halides of titanium and zirconium, such as $TiCl_4$, $ZrCl_4$, etc., and the oxyhalides of vanadium and niobium, such as $VOCl_3$, etc. Preferred reducible compounds include $TiCl_4$, $ZrCl_4$, etc. The catalysts can be reduced by, for example, organic compounds of aluminum. Examples of preferred reduced compounds include $TiCl_3$, $TiBr_3$, $TiCl_3.\frac{1}{3}AlCl_3$, etc.

The alkyl groups in the trialkylaluminum compounds used in the invention may be the same or different and each may be straight or branched-chain and contain 1 to 10 carbon atoms. In a preferred embodiment each alkyl group has 2 to 6 carbon atoms and in the most preferred embodiment each alkyl group has 2 to 4 carbon atoms. Examples of typical trialkylaluminum compounds include triethylaluminum, trihexylaluminum, tridecylaluminum, dimethylethylaluminum, diethylpropylaluminum, ethylpropylhexylaluminum, butyldecyloctylaluminum, tris(2-methylethyl) aluminum, etc. Preferred trialkylaluminum compounds include triethylaluminum, trimethylaluminum, tripropylaluminum, butyldimethylaluminum, etc.

The alkyl groups in the dialkyl aluminum halide compound may be the same or different and each may be straight- or branched-chain and contain 1 to 10 carbon atoms. In a preferred embodiment each alkyl group has 2 to 6 carbon atoms and in the most preferred embodiment each alkyl group has 2 to 4 carbon atoms. The halide may be any of the halides, i.e. bromide, chloride, iodide or fluoride. Bromides, chlorides or iodides are most commonly used and the preferred halide is chloride. Examples of typical dialkylaluminum compounds include diethylaluminum chloride, diethylaluminum bromide, ethylmethylaluminum chloride, butylpropylaluminum iodide, dihexylaluminum chloride, dioctylaluminum bromide, didecylaluminum iodide, bis(3-ethylhexyl)aluminum chloride, diethylaluminum fluoride, etc. Preferred dialkylaluminum halides include diethylaluminum chloride, diethylaluminum bromide, diethylaluminum iodide, dipropylaluminum chloride, ethylpropylaluminum chloride, etc.

The total amount of trialkylaluminum compound and dialkylaluminum halide activator used in the polymerization varies from the minimum amount effective to activate the catalyst up to about 50 moles or more per each mole of catalyst used in the polymerization.

Amounts as small as 0.001 mole of activator per mole of catalyst are often effective to produce the desired result. Activator in excess of about 50 moles per mole of catalyst is usually wasteful and provides no additional advantages. The preferred lower limit of activator is often about 0.01 mole and the most preferred lower limit is about 0.1 mole per mole of catalyst. The upper activator limit preferably does not exceed about 25 moles and most preferably does not exceed about 10 moles per mole of catalyst used in the polymerization reaction.

The relative amounts of trialkylaluminum and dialkylaluminum halide in the activator system generally vary from about 1 mole of trialkylaluminum per each 99 moles of dialkylaluminum halide to about 20 moles of trialkylaluminum per each 80 moles of dialkylaluminum halide. In preferred embodiments of the invention the mole ratio range of trialkylaluminum to dialkylaluminum halide is about 3:97 to about 15:85.

Other additives such as chain transfer agents can be added to the reaction mixture as desired.

A typical polymerization according to the preferred embodiment is carried out as follows. A suitably equipped reaction vessel is flushed with nitrogen sufficiently long to purge the reactor of oxygen, and the monomers, solvent (if solvent is initially charged) and activators are charged to the reactor. The reactor is then blanketed with nitrogen and sealed. The temperature of the reactor contents is adjusted to the desired polymerization temperature, typically in the range of about $-20°$ to $30°$ C., the catalyst is charged, and the reactor is pressurized to about 50 psig. As the viscosity builds up an inert solvent such as kerosene or an inert diluent may, if desired, be added to the reaction vessel in a quantity sufficient to maintain the reactor contents in an easily stirable condition. The polymerization is permitted to continue until the desired conversion of monomer to polymer is achieved. The reaction is terminated by adding an agent to deactivate the catalyst. Suitable deactivating agents include alcohols, such as methyl or isopropyl alcohol. The polymeric product can be recovered from the reaction mixture by precipitation using excess alcohol or it can be used directly as a slurry or solution. Additional details of the product and its method of use can be obtained from U.S. patent application Ser. No. 230,775, mentioned above.

The invention is further illustrated in the following examples, in which parts and percentages are on a weight basis, unless otherwise indicated.

In testing the polymers prepared in the following examples for hydrocarbon fluid friction reducing effectiveness the following procedure was followed. The hydrocarbon test fluid, hexane, was pumped through a test line ¼ inch in diameter and 3 feet long at conditions which resulted in a Reynolds number of about 12,600. The amount of polymer added to the hexane in each test was 2 parts per million (ppm). The percentage drag reduction was calculated using the following equation $$\% \text{ drag reduction} = \frac{Po - Ps}{Po} \times 100$$

wherein Po is the measured pressure drop occurring when hexane without drag reducing agent was pumped through the test line and Ps in the measured pressure drop occurring when the hexane containing drag reducing agent was pumped through the test line.

EXAMPLE I (Comparative)

A three liter stainless steel reactor equipped with a thermocouple, an agitator and a cooling jacket was purged with nitrogen and charged with 915.7 g of mineral spirits having a boiling range of 184° C. to 197° C., 106.2 g of dodecene-1, 14.3 mls of a 25.7 weight percent solution (0.0226 mole) of diethyl aluminum chloride (DEAC) in heptane and 1.5 g of aluminum activated titanium trichloride (TiCl$_3$.⅓AlCl$_3$, sold by Stauffer Chemical Company under the designation Type 1.1). The reactor was blanketed with nitrogen, 18.8 g of butene-1 was added to the reactor, and the reactor was pressurized with nitrogen to 50 psig. The reaction began upon addition of the catalyst and reactants. The temperature was maintained at 15° C. throughout the polymerization. The reactor contents were agitated sufficiently to ensure a uniform temperature throughout the reaction mixture during the polymerization period. The polymerization was terminated by adding sufficient alcoholic potassium hydroxide to completely deactivate the catalyst.

Drag reduction performance data was obtained on the polymer formed. Reaction and drag reduction performance data are tabulated in the Table.

EXAMPLE II (Comparative)

The procedure of EXAMPLE I was repeated except that 0.0226 mole of triethylaluminum (TEAL) was substituted for the DEAC solution. Reaction and drag reduction performance data obtained on the resulting polymer are tabulated in the Table.

EXAMPLE III

The procedure of EXAMPLE I was repeated except that 0.0011 mole of TEAL and 0.0177 mole of DEAC were substituted for the 0.0226 mole of DEAC. Reaction and drag reduction performance data are tabulated in the Table.

TABLE

| Example | Activator | Polymer, % | Batch Time, Hours | Drag Reduction, % |
|---|---|---|---|---|
| I | DEAC | 7.0 | 12 | 9.7 |
| II | TEAL | 7.1 | 2 | 4.2 |
| III | DEAC & TEAL | 7.6 | 8 | 18.2 |

The above examples illustrate the benefits of the invention. In Example I, in which diethylaluminum chloride was used as the sole catalyst activator the reaction time was 12 hours and the % drag reduction was 9.7. In Example II, the sole catalyst activator was triethylaluminum. The reaction time was only 2 hours but the polymer produced a drag reduction of only 4.2%. In Example III, which illustrates the invention, a polymer was prepared using a mixture of diethylaluminum chloride and aluminumtriethyl. The polymerization time was intermediate to the polymerization times for the Example I and II runs; however, the drag reduction observed when the Example III polymer was used was 18.2%, almost double that of the next best drag reducing polymer prepared, the Example I polymer.

Although the invention is described with particular reference to specific examples, it is understood that alternate embodiments are contemplated. For example more than one trialkylaluminum and/or dialkylaluminum chloride catalyst activator can be used in the polymerization reaction or mixtures of catalysts can be employed. Furthermore, the polymers can be used to reduce friction in the pumping of other hydrocarbon fluids, such as crude oil. The scope of the invention is limited only by the breadth of the appended claims.

What is claimed is:

1. An improved process for preparing a hydrocarbon fluid friction reducing composition comprising mixing two or more alpha-monoolefins having 2 to about 30 carbon atoms in a diluent or an organic solvent and copolymerizing the alpha-monoolefins in the presence of a catalyst comprised of a reducible or reduced titanium halide and an organo metal catalyst activator consisting of, per each 100 total moles of activator, about 1 to 20 moles of at least one trialkylaluminum compound, each alkyl group of which has 1 to 10 carbon atoms and about 99 to 80 moles of at least one dialkylaluminum halide compound, each alkyl group of which has 1 to about 10 carbon atoms, the mole ratio of activator to catalyst in the reaction mixture being in the range of about 0.001:1 to 50:1.

2. The improved process of claim 1 wherein said alpha-monoolefins have 4 to 20 carbon atoms and said organic solvent is selected from kerosene, naphtha, petroleum distillate, alkanes having 6 to 10 carbon atoms and mixtures of these.

3. The improved process of claim 2 wherein said copolymer is prepared from butene-1 and at least one other alpha-monoolefin having 5 to 16 carbon atoms.

4. The improved process of claim 3 wherein said other alpha-monoolefin is selected from hexene-1, octene-1, decene-1, dodecene-1, tetradecene-1 and mixtures of these.

5. The improved process of any one of claims 2, 3, or 4 wherein the ratio of activator to catalyst is in the range of about 0.01 to 25 moles of activator per mole of catalyst, and the mole ratio of total trialkylaluminum compound to total dialkylaluminum halide compound is in the range of about 3:97 to 15:85, and each alkyl group in the trialkylaluminum compound and each alkyl group in the dialkylaluminum halide compound has 2 to 6 carbon atoms.

6. The improved process of claim 5 wherein said catalyst is selected from titanium tetrachloride, titanium trichloride, and mixtures of these.

7. The improved process of claim 6 wherein said trialkylaluminum compound is triethylaluminum and said dialkylaluminum halide compound is diethylaluminum chloride.

* * * * *